US006847365B1

(12) United States Patent
Miller et al.

(10) Patent No.: US 6,847,365 B1
(45) Date of Patent: Jan. 25, 2005

(54) SYSTEMS AND METHODS FOR EFFICIENT PROCESSING OF MULTIMEDIA DATA

(75) Inventors: Richard G. Miller, Cupertino, CA (US); Louis A. Cardillo, Palo Alto, CA (US); John G. Mathieson, Los Gatos, CA (US); Eric R. Smith, Halifax (CA)

(73) Assignee: Genesis Microchip Inc., Alviso, CA (US)

( * ) Notice: Subject to any disclaimer, the term of this patent is extended or adjusted under 35 U.S.C. 154(b) by 0 days.

(21) Appl. No.: 09/476,761

(22) Filed: Jan. 3, 2000

(51) Int. Cl.$^7$ .............................................. G06F 15/16
(52) U.S. Cl. ..................... 345/502; 345/505; 712/15
(58) Field of Search ..................... 345/530, 501, 345/502, 505, 506, 536, 555, 155, 541, 431, 504; 712/10, 15, 16, 28, 32, 18, 23

(56) References Cited

U.S. PATENT DOCUMENTS

| | | | | |
|---|---|---|---|---|
| 5,081,450 A | * | 1/1992 | Lucas et al. ................ | 345/155 |
| 5,212,742 A | * | 5/1993 | Normile et al. ............. | 382/166 |
| 5,510,843 A | * | 4/1996 | Keene et al. ............... | 348/446 |
| 5,754,186 A | * | 5/1998 | Tam et al. .................. | 345/435 |
| 5,809,321 A | * | 9/1998 | Hansen et al. ................ | 712/1 |
| 5,838,985 A | * | 11/1998 | Ohki .......................... | 712/16 |
| 5,847,771 A | * | 12/1998 | Cloutier et al. ............. | 348/564 |
| 5,892,962 A | * | 4/1999 | Cloutier ...................... | 712/16 |
| 5,982,432 A | * | 11/1999 | Uenoyama et al. .......... | 348/391 |
| 6,347,344 B1 | * | 2/2002 | Baker et al. .................. | 710/20 |

* cited by examiner

Primary Examiner—Matthew C. Bella
Assistant Examiner—Mackly Monestime
(74) Attorney, Agent, or Firm—Beyer Weaver & Thomas, LLP

(57) ABSTRACT

A media processing system is provided including a DRAM that includes a plurality of storage locations for storing digital data being processed by said media processing system, said digital data including video data that is compressed in a standardized format, a system for processing said digital data that includes said standardized format compressed video data to produce compressed video images and image data, a system for decoding said standardized format compressed video images to generate full motion video pixel data, a system for sharing said DRAM between said processing means and said decoding means, and a system for producing a full motion video signal from said full motion video pixel data. The media processing system may also have a system for multiplying or combining a first pixel by a second pixel in a single clock cycle. The media processing system may have a plurality of processing elements connected together in parallel, a system for controlling said processing elements with instruction words that have a predetermined number of instructions, and a system for distributing data simultaneously to each of said processing elements.

21 Claims, 10 Drawing Sheets

SYSTEMS AND METHODS FOR EFFICIENT PROCESSING OF MULTIMEDIA DATA

BACKGROUND OF THE INVENTION

This invention relates generally to a novel processing architecture for use in multimedia applications, and more particularly to a processing architecture and associated method adapted to decompress compressed digital video and audio data, processes the digital video and audio data, as well as other digital data, and generate high resolution color multimedia data for presentation on a computer system or other suitable multimedia presentation system.

Compression of full-motion digital images to facilitate storage of the digital video images on a relatively narrow bandwidth media, such as a DVD, a CD, or a computer memory, is known. A typical single full image video frame for a computer screen consists of over 300,000 pixels, where each pixel is defined by one of 16.7 million colors in a 24 bit color system. This single full color image frame may be stored in approximately 1 million bytes (1 Mb) of memory. To achieve animation in an application, such as a video game, a video system should generate and display about 30 color frames per second. Thus, for one minute of full-motion, color video, the system preferably should be able to store two gigabytes (2 Gb) of image data. Similarly, a full color, still frame image scanned at 300 dots per inch requires in excess of twenty-five (25) megabytes of memory. These memory requirements are extraordinary large, and storage devices capable of storing that much data are expensive.

Furthermore, the rate at which the full color image data needs to be retrieved from the storage device in order to generate full-motion color images exceeds the effective data transfer rate of most existing storage devices. For example, assuming that a typical storage device can transfer data at a rate of about 250 KB per second, the retrieval of full-motion color video images at the necessary rate of 30 MB per second (thirty 1 MB frames per second) cannot be accomplished. This hypothetical storage device is 120 times too slow.

Therefore, image compression techniques that can reduce the amount of data required to represent a full color image, while retaining sufficiently high quality images were developed. In most of these techniques, the amount of image data is reduced by identifying places where information may be removed without significant image quality loss (i.e., where the human eye is not as sensitive). For example, the human eye is more sensitive to black and white detail than to color detail. Thus, many known techniques reduce the amount of color information about each pixel in a image without any significant perceptible reduction in the image quality.

These known compression techniques include differential pulse code modulation, Motion Picture Experts Group (MPEG) compression, and MPEG-2 compression. The MPEG format was intended to be a standard for compression and decompression of digital full-motion video and audio data for use in computer systems. The MPEG-2 format is an extension of the MPEG format that supports digital, flexible, scalable video transport. The MPEG and MPEG-2 formats are becoming the standard technique for compressing and decompressing full-motion video signals.

Once an image is compressed using these techniques, the compressed image data then typically is decompressed, and in some instances processed, in order to display the images. The decompression and processing of the compressed image data requires a large amount of processing power and also requires a large amount of memory. A conventional system for decoding/decompressing a compressed digital video image includes a memory that holds both the compressed digital video image as well as the uncompressed digital video image, and a decoder for decompressing the image and storing the image within the memory. The known decompression systems may be used in PCs, DVD players, digital satellite television systems, and cable television systems, to name but a few applications. These known systems use memory intensive operations to decode the compressed images and typically require at least 2 MB of storage space. As one skilled in the art will appreciate, these systems tend to be expensive due to the large amount of memory required for decompression. Moreover, these systems only decompress the images and do not process digital data from other sources in order to generate composite images. Finally, in order to decompress the data and simultaneously process through video data, additional memory and processing power is needed, which typically is not available in conventional video decompression systems.

In addition, conventional processing systems exist that have sufficient processing power to generate video images, but none of these systems are optimized to decompress and process full-motion color images quickly and efficiently. Typically, these processing systems also require a separate decompression system that is attached to the processing system.

Finally, none of these conventional systems decompress and process media data quickly enough for applications, such as full-motion color video games, virtual reality systems, and cable television receivers. And, none of these systems provide an inexpensive, fully functional media processing system, because none of the conventional systems include both an integrated full-motion image data decompression and processing system.

Thus, there is a need for a media processing system and method which avoids these and other problems of known devices.

SUMMARY OF THE INVENTION

The invention provides a media processing system that decompresses and processes video data simultaneously to generate full-motion color images that may be used in satellite digital television systems, a video game systems, cable television systems, or the like. The media processing system also may have a memory that is shared between the decompression system and the processing system to reduce the overall cost of the system.

In accordance with the invention, a media processing system is provided that may include a dynamic random access memory (DRAM) or other suitable storage device for storing digital data which includes video data that is compressed in a standardized format. The DRAM is shared by a processing system and a decoding system. The digital data is processed to produce compressed video images and image data. The compressed video images are then decoded to generate full-motion video pixel data The full-motion video pixel data is then used to produce a full-motion video signal that may be displayed. The DRAM also may include compressed audio data that may be decoded and then combined with the full-motion video signal to produce multimedia data. The media processing system also may multiply or combine two pixels together in a single processing cycle. The media processing system also may be fabricated on a single semiconductor chip.

A more complete understanding of the present invention may be derived by referring to the detailed description of

DETAILED DESCRIPTION OF THE PREFERRED EMBODIMENTS

The invention is directed to a novel processing architecture, and more particularly to a processing architecture that can decompress and process video data at or near the same time to generate multimedia images. It is in this context that the invention will be described. It will be appreciated, however, that the system and method in accordance with the invention has greater utility.

Figure 1:
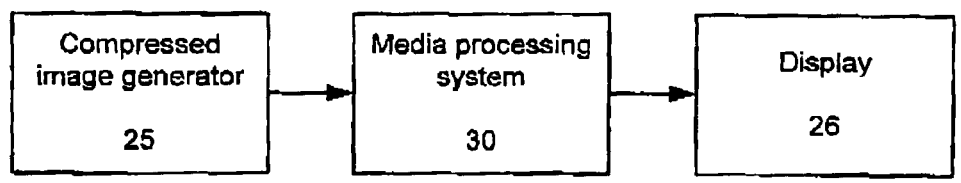
FIG. 1 is a block diagram of a media processing system.

FIG. 1 is a general block diagram of a system 20 configured to decompress and process digital data to generate multimedia data in accordance with the invention. The system preferably includes a compressed image generator 25, such as a hard disc drive, a cable television system, a satellite receiver, or a CD or DVD player, that can generate or provide a digital compressed media stream. System 20 also includes a display system 26 for displaying decompressed fall-motion images. The compressed media stream, that may include audio and visual data, enters a media processing system 30 configured to decompress the compressed media stream. In addition, media processing system 30 also may process digital data contained in the compressed data stream or in another storage device or digital data source, at the same time as it decompresses the compressed media stream, thus generating other types of media data that may be used with the decompressed media stream. For example, an interactive, color, full motion video game may be created. Once all of the data has been decompressed and processed, the data is output to display system 26 for viewing. For a cable or satellite television system, media processing system 30 simply may decompress the incoming compressed digital data and output the images onto display 26, which in accordance with one embodiment of the present invention, may be a television screen.

Figure 2:
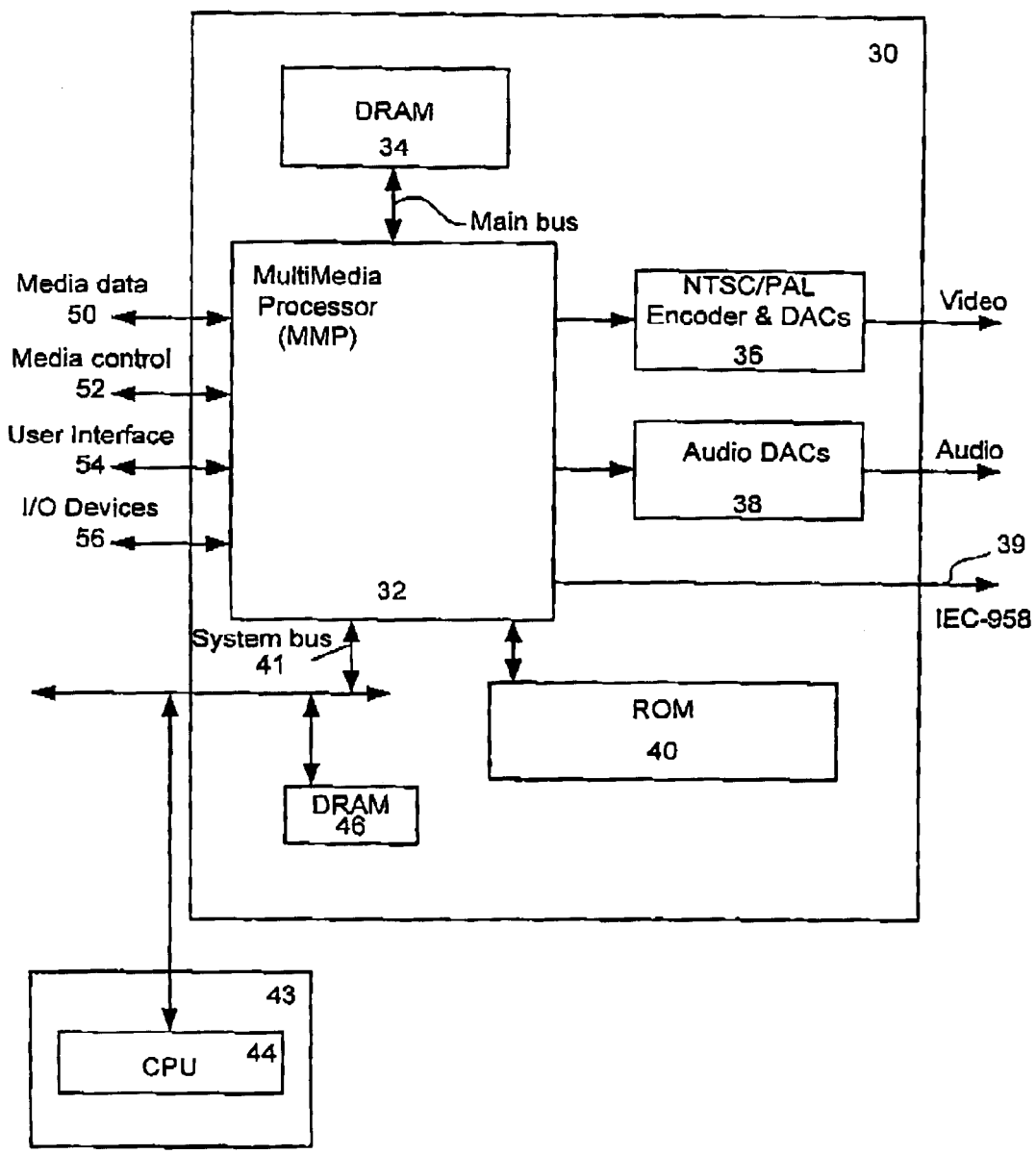
FIG. 2 is a block diagram depicting a media processing system that includes a media processor in accordance with the invention.

FIG. 2 is a block diagram of the architecture of media processing system 30 in accordance with one embodiment of the present invention. Media processing system 30 includes a media processor 32, which can perform a number of operations, such as decompressing compressed video data, processing digital data that may include the decompressed video data and/or other digital data to generate full-motion color images, and controlling other operations within media processing system 30. Media processor 32 may be fabricated on a single semiconductor chip, or alternatively, the components of media processor 32 may be partitioned into several semiconductor chips or devices.

Media processing system 30 also preferably includes one or more storage devices 34, 46, such as DRAM, SDRAM, flash memory, or any other suitable storage devices for temporarily storing various types of digital data, such as video or visual data, audio data and/or compressed data. Any data that is to be processed or decompressed by media processing system 30 preferably is loaded from a main memory (not shown) into DRAM and/or SDRAM, because DRAM and/or SDRAM can be accessed more rapidly due to its quicker access time. Data that has been processed by media processing system 30 may be temporarily stored in the DRAM and/or SDRAM either before being displayed on the display or before being returned to the main memory.

When processing multimedia data, media processor 32 is configured to generate a digital image data stream and a digital audio data stream. A video encoder and digital-to-analog converter (DAC) 36 converts the digital image data output from media processor 32 into analog image signals, such as composite video, s-video, component video, or the like that can be displayed on a display device, such as a television or a computer monitor. An audio digital-to-analog converter (DAC) 38 converts the digital audio signals output by media processor 32 into analog audio signals (preferably about 2–8 separate audio channels) that can be broadcast by an audio system, or the like. In accordance with an alternative embodiment, media processor 32 also may output an IEC-958 stereo audio or encoded audio data signal 39, which is an audio output signal intended for connection to systems which may have internal audio decoders or digital-to-analog converters (DACs).

Media processor 32 also may include a second storage device 40, such as a read only memory (ROM) or the like, which can be used to store a basic input/output operating system (BIOS) for media processing system 30, audio tables that may be used to decompress the audio data and generate synthesized audio, and/or any other suitable software or data used by media processor 32 and media processing system 30. Media processor 32 further may include an expansion bus 42 connected to a system bus 41, so that one or more expansion modules 43 may be connected to media processor 32. Expansion module 43 may include additional hardware, such as a microprocessor 44 for expanding the functionality of media processing system 30. As illustrated in FIG. 2, additional memory 46 also may be connected to processor 32 via expansion bus 42 and system bus 41.

Media processor 32 may include several communication connections for communicating between media processor 32 and the rest of media processing system 30. A media_data connection 50 permits the transfer of media data between media processor 32 and other systems, such as compressed image generator 25 (FIG. 1). A media_control connection 52 transfers control signals and/or data between media processor 32 and other systems, such as intelligent interface controller (I²C) compatible devices and/or interface hardware connected to system bus 41. A user_interface connection 54 transfers user interface data between media processor 32 and user interface peripherals, such as joysticks, IR remote control devices, etc. Finally, an input/output channel connection 56 allows for connections to other I/O devices for further expansion of the system.

Media processing system 30 may be used for a variety of applications, such as full-motion color video games, cable and satellite television receivers, high definition television receivers, computer systems, CD and DVD players, and the like. For example, in a video game application, digital data representing terrain, action figures, and other visual aspects of a game may be stored in main memory or input from a peripheral digital data source. In accordance with this aspect of the invention, media processing system 30, and more particularly processor 32, processes the digital data from one or more digital data sources, generating interactive full-motion color images to be displayed on a video game display. Media processing system 30 also may generate audio signals that may add music and sound effects to the video game.

For a cable or satellite television receiver, media processing system 30 decompresses compressed digital video and audio signals received from a cable headend system or satellite transmitter, and generates decompressed digital video and audio signals. The decompressed digital video and audio signals then are converted into analog signals that are output to a television display. Media processing system 30 also may be configured to decrypt any encrypted incoming cable or satellite television signals.

For a DVD player, media processing system 30 preferably receives compressed digital data from a DVD or CD, and decompresses the data. At the same time, media processing system 30 may receive digital data stored on a ROM, for example ROM 40, or input from another digital data source, and generate a video game environment in which the decompressed DVD or CD color images are displayed along with the data received from the ROM or other digital data source. Thus, an interactive, full-motion, color multimedia game may be operated by media processing system 30.

Figure 3:
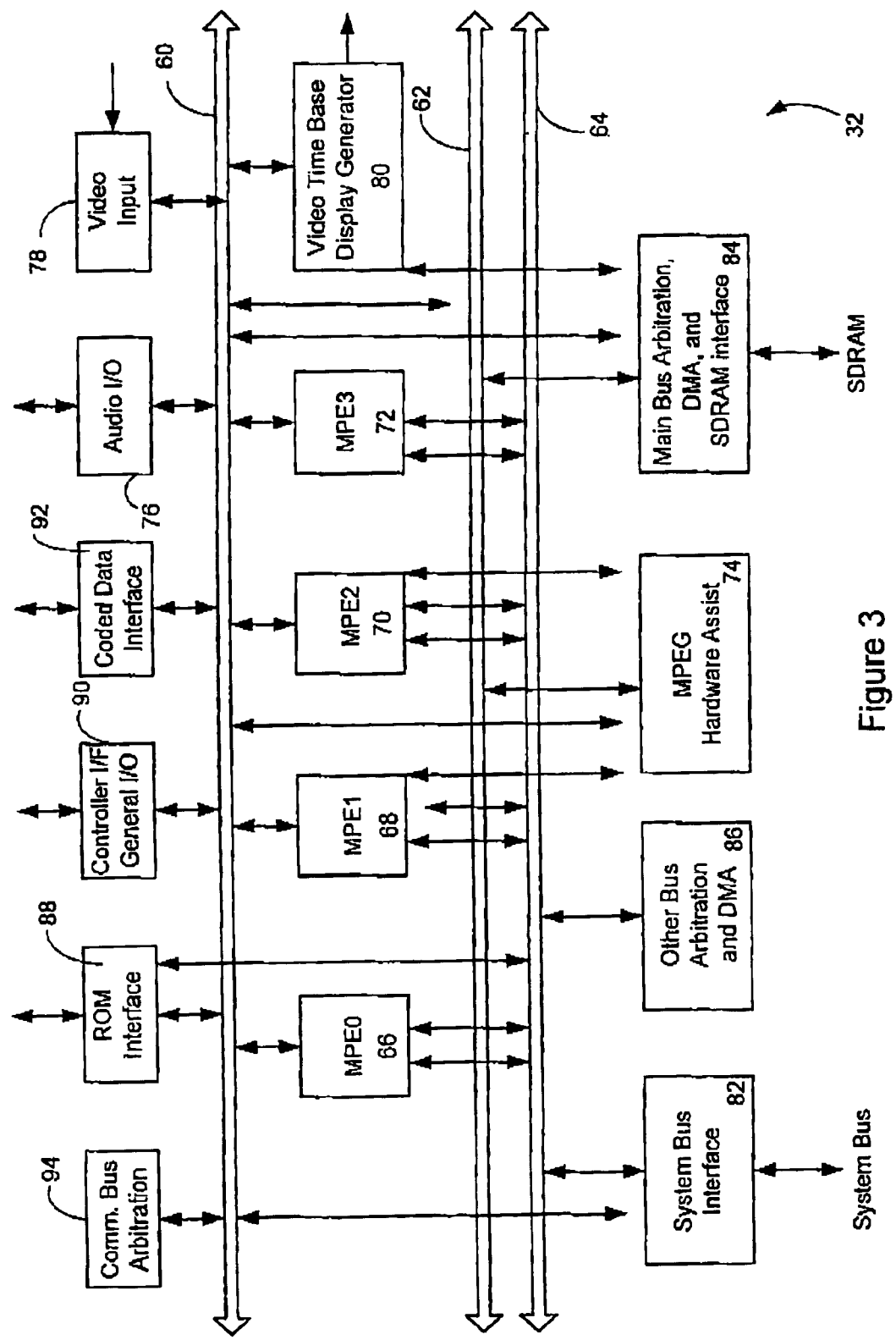
FIG. 3 is a block diagram of the media processor of FIG. 2.

Referring now to FIG. 3, the internal architecture of media processor 32, which performs the applications outlined above, as well as many other processing applications, will now be described in more detail. More particularly, FIG. 3 is a block diagram of the media processor 32 having an internal parallel architecture. The parallel architecture of the present invention provides the necessary processing power and speed to decompress and process digital data, enabling full-motion color images to be generated. Although the parallel architecture may be used for a variety of different applications, the parallel architecture is particularly applicable to multimedia processing applications.

In accordance with one embodiment of the present invention, media processor 32 comprises a communication bus 60, a main bus 62 and a supplemental (supp) bus 64, all of which are used to connect various processing elements and sub-system units of processor 32. More specifically, processor 32 preferably comprises a first processing element (MPE0) 66, a second processing element (MPE1) 68, a third processing element (MPE2) 70, a fourth processing element (MPE3) 72, a decode assist unit 74, and an audio/visual I/O system, which in accordance with one embodiment of the present invention, comprises an audio I/O unit 76, a video I/O unit 78, and a video time-base and display generator 80.

Main bus 62 is a 32-bit bus with a maximum data transfer rate of about 0.216 Mbytes/sec either between MPE memory and external SDRAM, or from one MPE to another. This bus may be used for transferring bursts of data, and has extensive support for pixel transfer, including bi-linear addressing and Z-buffer compares. It also is used for video and audio output. Preferably, media processing system 30 will have a minimum of 8 Mbytes of SDRAM connected to this bus.

Supp bus 64 preferably is a 16-bit bus, and is like a simpler, slower version of the Main Bus. Supp bus 64 is used to talk to system bus memory and other devices connected to the system bus, and performs linear data transfers, at a maximum rate of about 108 Mbytes/sec. Preferably media processing system 30 will have a minimum of 8 Mbytes of DRAM connected to this bus.

In one embodiment, communication bus 60 is another 32-bit bus, with a maximum data transfer rate of around 172 Mbytes/sec, and is used for transferring 128-bit packets either between the MPEs, or to allow MPEs to talk to peripheral devices. Communication bus 60 is a low latency bus, and is good for inter-processor communications. For a more detailed discussion of communication bus 60, see U.S. patent application Ser. No. 09/476,946, filed Jan. 3, 2000, and entitled "Communication Bus for a Multi-processor System," the entirety of which is incorporated herein by reference.

Compared to a more standard single bus architecture where data and commands must travel over the same bus, this particular parallel bus structure permits an increased amount of data to be processed by media processing system 30 because control signals/commands and data are communicated over the separate buses. By increasing the number of commands and data transferred between the processing elements and sub-system units, the total processing power of the system can be increased.

Still referring to FIG. 3, the processing elements and sub-system units will now be discussed in more detail. In particular, processor 32 preferably includes processing elements (MPEs) 66, 68, 70 and 72. One of these processing elements preferably is used, at least in part, as a control processing element, for controlling the overall operation of processor 32. For example, the control processing element may (1) control the movement of some or all of the data between each of the MPEs and other system units; (2) schedule tasks for the MPEs and system units to perform; and (3) perform other suitable control functions. In this manner, if tasks are scheduled properly and data is utilized efficiently, every MPE and sub-system unit within media processor 32 may be kept busy all or most of the time. By keeping all or most of the MPEs and sub-system units within media processor 32 active, more data and commands are being processed, thus increasing the overall speed of the system.

Although the invention is not limited to any particular application or media system, the operation of processor 32 will be explained by way of an example of processing an MPEG video data stream. The MPEG format includes an MPEG-1 standard and an MPEG-2 standard, with the MPEG-2 standard begin the more widely used of the two due to its improved image compression abilities. The MPEG formats represent each pixel with a luminance value that corresponds to the brightness of the particular pixel. In addition, every four pixels also are sampled to generate two chrominance values that represent the color of the four pixels. Thus, six bytes are used to store data relating to four pixels. This format is known as a 4.2.0 sub-sampling format. In an uncompressed image, the same four pixels would require at least twelve bytes of memory. An MPEG decoder converts the 4.2.0 sub-sampled compressed format signal back into signals representing a plurality of individual pixels so that the pixels may be displayed on a display system. MPEG and MPEG-2 compression and decompression techniques are generally known in the art, and thus will not be described in detail herein.

As illustrated in FIG. 3, all media processing elements (MPEs) 66–72 preferably are connected to each of the buses 60–64. Although four MPEs are shown, the invention is not limited to any particular number of MPEs and may have as few as one MPE or a large number of them. However, in accordance with one embodiment of the present invention, four MPEs preferably are used. As discussed briefly above, these four MPEs may be fabricated on a single semiconductor chip, or on multiple chips.

In accordance with one embodiment of the present invention, each MPE 66–72 is a single instruction stream, multiple data stream (SIMD) general purpose very-long-instruction-word (VLIW) RISC processor that can operate independently of every other MPE. Thus, in accordance with the embodiment illustrated in FIG. 3, up to 4 separate complex processing tasks may be performed simultaneously or virtually simultaneously. In addition, for larger, more complex tasks, the controlling processor may have several or all of the MPEs work on the same task. For example, when generating a three-dimensional image, one MPE can calculate the polygons that form the actual image, while another MPE can draw (render) the polygons. Thus, the MPEs can operate independently in parallel or cooperatively together, depending on the task. This flexibility allows the media processing system to handle a variety of different tasks, such as graphics processing, database searching, numerical processing, and the like. In addition, each of the MPEs 66–72 preferably utilizes the same general purpose instruction set.

In accordance with one embodiment of the present invention, to process an MPEG-2 video data stream, the tasks necessary to decode the MPEG data and generate full-motion color images may be divided between the MPEs. Thus, for example, one MPE may process audio data, one MPE may generate the uncompressed video data, one MPE may act as a data stream parser or multiplexer, and the other MPE may perform control functions.

Still referring to FIG. 3, a specific example of how processor 32 may process a DVD data stream which my include an MPEG-2 data, subpicture data, overlay data, control data, etc. In accordance with this particular example of the present invention, to process a DVD data stream, MPE1 68 preferably is configured to receive the data stream and divide or parse it into its discrete components, such as a compressed video data component, a compressed audio data component, a subpicture data component, a navigation and control data component, etc. After the DVD data steam is parsed into its separate components, the data is then placed in memory, which acts as a data buffer. At or near the time the data is to be presented, MPE1 68 preferably pulls the data out of memory and sends the separate components of the data to the different MPEs and sub-system units for processing.

In accordance with this particular example, MPE0 66 preferably is configured to decode and/or decompress the compressed audio portion of the MPEG-2 data stream. Similarly, MPE1 68, MPE2 70 and decoder unit 74 are configured to perform the decode or decompression of the MPEG-2 video data stream. As illustrated in FIG. 3, decoder unit 74 includes direct connections to both MPE1 68 and MPE2 70 to facilitate high-speed transfer of data between decoder unit 74 and MPEs 68, 70. In addition, decoder unit 74 preferably is connected to communication bus 60 and main bus 62 to facilitate data transfer between decoder unit 74 and memory, and other MPEs and sub-system units.

MPE1 68 preferably parses the MPEG-2 and DVD data into its separate components, and then passes the video data stream to MPE2 70 and decoder unit 74 for the remaining decode functions. For example, MPE2 70 is configured to perform stream parsing and motion vector decode functions, while decoder unit 74 is configured to perform lower parts of the MPEG decode, such as inverse discrete cosine transform (IDCT), dequantization and motion prediction functions. As illustrated in FIG. 3, the direct connections between MPE2 70 and decoder unit 74 allows for the fast transfer of data between the units, thus facilitating fast decode of the video data stream.

After the MPEG video stream is decoded, it preferably is passed to memory where it is stored until presented to a viewing apparatus, such as a TV or a computer monitor. MPE3 72 preferably is configured to process subpicture, menu, navigation and other video and audio control functions.

After all the audio, video and DVD information is decoded and placed in memory, display generator 80 retrieves the video, subpicture and control information from memory and performs some processing. For example, in accordance with one embodiment of the present invention, the video information is stored in memory in 4:2:0 MPEG format. Display generator 80 converts the 4:2:0 format to 4:2:2 format, which is consistent with CCIR 656 standard video format. In addition, display generator 80 combines video information with overlay information, such as menus and the like, and subpicture channel information and presents the entire packet of information as an output. Finally, display generator 80 is configured to perform video timing and refresh functions, and may perform some of the subpicture decoding operations. A more detailed description of how display generator 80 interacts with one or more of the MPEs to perform subpicture decode is set forth in U.S. patent application Ser. No. 09/476,698, filed Jan. 3, 2000, and entitled "Subpicture Decoding Methods and Apparatus," the entirety of which is incorporated herein by reference.

While the above example was set forth herein as decoding an MPEG-2 video stream and other information from a DVD device, one skilled in the art will appreciate that processor 32 can perform processing functions or a media data stream from any source, such as from a digital still camera, a digital video camera, a cable or satellite TV system, a ROM or hard drive, or any other suitable data source. In addition, processor 32 can be configured to process any type of data, not just media data. Finally, while the above example sets forth specific functions and are performed by MPEs 66–72 and other sub-system units, such as decoder unit 74 and display generator 80, one skilled in the art will appreciate that the present invention is not limited to this particular separation of functions. The MPEs and sub-system units can be configured to perform any number of different functions. Therefore, the present invention is not limited to the example set forth herein or illustrated in FIG. 3.

Processor 32 also may include a system bus interface 82, which is electrically connected to communication bus 60, supp bus 64, and system bus 41 (FIG. 2) of media processing system 30. System bus interface 82 provides a communications path between processor 32 and memory and other peripheral devices that are connected to system bus 41 and/or expansion bus 42. For example, as illustrated in FIG. 2, processor 32 is connected to DRAM 46 and expansion module 43 via system interface 82 and system bus 41. By utilizing system bus interface 82, processor 32 can be connected to a number of different devices, including memory, external processors, peripheral devices, and the like.

Media processor 32 further may include a main bus arbitration and memory access unit 84. The main bus arbitration portion of unit 84 preferably controls and arbitrates the bus traffic on main bus 62. Unit 84 also preferably provides an interface to memory, for example memory 34 illustrated in FIG. 2. To access memory 34, unit 84 may include or be in communication with a memory arbitration system (not shown), a direct memory access unit (not shown), and/or a DRAM interface (not shown).

As described above, communication bus 60 generally is used for communicating control signals and data between various systems within processor 32, as well as various systems and system interfaces outside of processor 32. For example, a ROM interface 88 may be connected to supp bus 64 and communication bus 60 for transferring data to and from a ROM, for example ROM 40 in FIG. 2. As discussed briefly above, the ROM may store program code and other data that is specific to media processor 32. A general input/output (I/O) interface 90 also may be connected to communication bus 60 to provide a communication path between media processor 32 and, for example, a user interface or a media control system (e.g. keyboards, joy sticks, mice, and other suitable user interfaces).

Also connected to communication bus 60 is a coded data interface 92 and a communication bus arbitration unit 94. Coded data interface 92 preferably receives coded data, such as MPEG video data, from sources such as a DVD player, a cable or satellite video feed, or the like, and communicates the data to one or more of MPEs 66–72, decoder unit 74 and/or memory via communication bus 60. Further, communication bus arbitration unit 94 preferably is configured to arbitrate the use of and control data communication across communication bus 60.

Finally, as discussed briefly above, processor 32 may include an audio I/O unit 76 and a video input unit 78. Audio I/O unit 76 preferably is connected to communication bus 60 and main bus 62 and is configured to receive audio digital bit-stream inputs from external audio sources, such a microphones, stereo systems, etc. The output from audio I/O unit 76 is the audio output of processor 32, and may comprises a variety of digital audio output formats, such as I²S, IEC 958, SP-DIF, AC_3, MPEG audio, MP3, DTS or any other known audio format. Video input unit 78 preferably is connected to communication bus 60 and is configured to receive digital video input (e.g., CCIR 656 digital video format) from, for example, video cameras, NTSC and PAL decoders, and the like.

In summary, although MPEs 66–72 are general purpose processing elements, the MPEs also preferably include particular instructions within their instruction sets that may be used to optimize media processing applications. These instructions will be described in more detail below. Also, each MPE is sufficiently general that as the media processing standards and algorithms for generating three-dimensional images change and improve, the MPEs may adapt to the newest standards and algorithms since the instructions easily can be changed to carry out the new algorithms. This flexibility of the MPEs permits media processing system 30, in accordance with the invention, to expand and to adapt to a user's demands and future innovations. For example, as better compression techniques are created, they may be easily incorporated into media processing system 30. In addition, since none of the MPEs are specifically constructed to perform any single function, if there is a bottleneck in any of the processing functions (e.g., in the audio processing system), another MPE may be used to process the audio data in order to reduce the bottleneck.

As described below in more detail, each MPE 66–72 preferably comprises a single instruction stream, multiple data stream (SIMD) internal hardware architecture, and a Very Long Instruction Word (VLIW) architecture. The VLIW architecture includes a plurality of parallel processing units, such as an arithmetic logic unit, a multiplier unit, etc., so that each processing unit may execute its own instruction on its own data. Thus, media processor 32, as discussed above, comprises a parallel architecture, and each of the MPEs 66–72 within media processor 32 also preferably comprises a parallel architecture, thus further increasing the total processing power of media processor 32 and media processing system 30.

Figure 4:
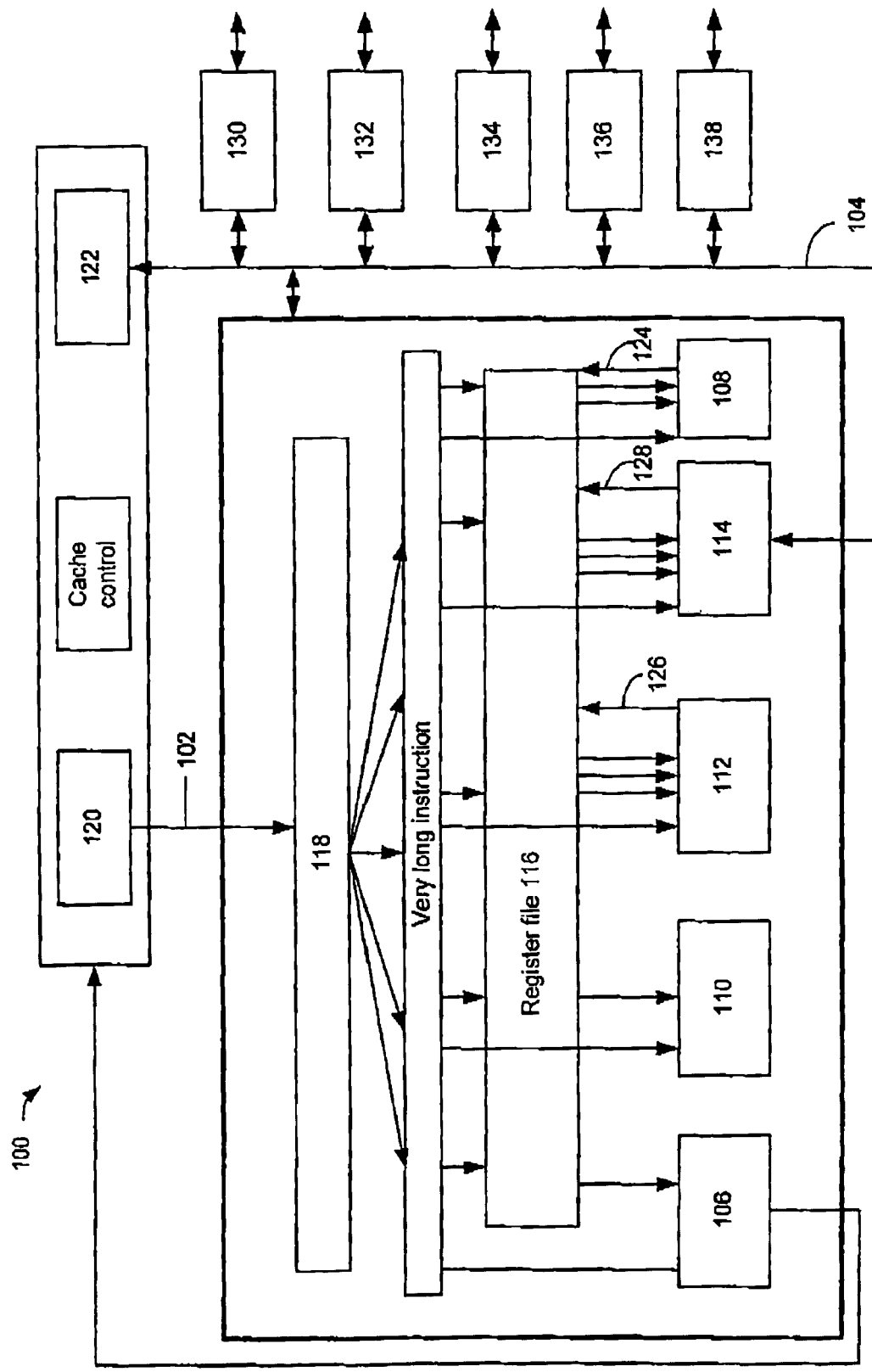
FIG. 4 is a more detailed block diagram of one of the processing elements shown in FIG. 3.

Referring now to FIG. 4, a block diagram illustrating an internal parallel architecture 100 of media processing elements (MPEs) 66, 68, 70, and 72, in accordance with one embodiment of the present invention, is shown. Similar to the parallel bus architecture of media processor 32, each MPE 66–72 also preferably includes a parallel bus architecture having an instruction bus 102 and a data bus 104. Instruction bus 102 preferably transmits instructions throughout the MPE, and data bus 104 preferably transmits data to and from various units within the MPE. As described above, the parallel instruction and data bus architecture increases the speed of the MPEs because the instructions and data do not travel over the same bus.

Architecture 100 of the MPEs may have a plurality of sub-units, such as an execution control unit (ECU) 106, a memory processing unit (MEM) 108, a register control unit (RCU) 110, an arithmetic logic unit (ALU) 112, a multiplication processing unit (MUL) 114, and a register file 116. In one embodiment, ECM 106, MEM 108, RCU 110, ALU 112 and MUL 114 all are connected together in parallel via register file 116. An Instruction Decompression and Routing unit 118 is connected to an instruction memory 120 via instruction bus 102, and is configured to decode and route instructions to the various processing units within the MPE. Instruction memory 120 stores a plurality of instructions, which control the various processing units in the MPE. The stored instructions are in the form of very long instruction word (VLIW) instructions, which, in one embodiment, have been compressed to reduce the amount of memory required to store the instructions. A more detailed discussion of the VLIW compression is set forth below.

Register file 116 may be used to temporarily store data that is being processed by any of processing units 106–114 in the MPE. For example, when two numbers are added together, each number may be loaded into registers in register file 116, and then the registers are added together with the result being stored in a register. As described below, register file 116 may be reconfigured to store various different types of data, including video processing specific data types, such as pixels.

MEM unit 108 is configured to control access to any storage elements in the MPE, such as a data memory 122 connected to MEM unit 108 by data bus 104. MEM unit 108 also may route data being transferred from another MPE or another system into the appropriate memory or register within the MPE. For example, the MPEs may receive data from memory or directly from another MPE or processing unit via data interfaces 130–138. Data from SDRAM connected to main bus 62 is transferred into the MPE via main bus DMA interface 134. Similarly, data from comm bus 60 and supp bus 64 is received by the MPE via comm bus interface 138 and supp bus DMA interface 136, respectively. Data can be transferred between one MPE memory 122 and another MPE memory 122 or system unit (e.g. decoder assist unit 74) via coprocessor DMA interface 132. Similarly, an MPE can access data in a register or register file of another MPE or system unit (e.g. decoder assist unit 74) via coprocessor interface 130. In accordance with the embodiment illustrated in FIG. 3, decoder assist unit 74 can pull data from data memory 122 of MPE1 68 via coprocessor DMA interface 132. Similarly, MPE2 70 can access registers in decoder assist unit 74 (and vice versa) via coprocessor interface 130. Finally, as illustrated in FIG. 4, architecture 100 includes a return register file port 124, which permits MEM unit 108 to write back data from MEM unit 108 to register file 116.

RCU 110 controls the allocation of a group of special registers (not shown) to the processing units so that there are no conflicts. ALU 112 performs arithmetic and logical operations on data that typically is stored in register file 116, and also may be optimized for pixel operations, as described in more detail below. MUL 114 performs multiplication of two pieces of data that typically are stored in the register file 116, and also may be optimized for pixel operations, as described below. As shown in FIG. 4, ALU unit 112 and MUL unit 114 both can return data back to register file 116 via return register file ports 126 and 128 respectively, so that the result data may be stored in one of the register file registers.

For the parallel pipelined VLIW architecture 100 shown, each MPE may process up to five independent instructions each clock cycle, because each of the processing units 106–114 may process a single independent instruction. For graphics applications with complex loop instructions that are executed repeatedly, such as a group of instructions for generating polygons in a three-dimensional environment or shading an image, each of the VLIW instructions within the loop may contain up to five operations, one for each of the processing units in the MPE. Thus, the internal parallel architecture of the MPEs further increases the processing power, and in particular, the graphics processing power, of media processor 32 and media processing system 30.

As an example of the optimization that may be realized from the parallel architecture of the MPEs, the optimization of program code that may be used to generate a smooth surface on a shaded object will now be described. For this example, a triangle will be shaded with a technique known as Gouraud shading. For Gouraud shading, adjacent pixel intensities are linearly interpolated between the vertices in an attempt to model smooth surface shading where the surface is built from a plurality of polygons, such as triangles. For purposes of this example, we will ignore the setup of the increment values. The variables for a given triangle used by the function are:

| Variable Name | Value & Comments |
| --- | --- |
| left_adx | the address of the top left pixel |
| left_pix | the intensity value of the top left pixel |
| line | the number of lines in the triangle |
| width | the width of the top line of the triangle |
| width_inc | the increment in width for each line |
| left_adx_inc | the increment in address of the left hand side of the triangle |
| h_pix_inc | the horizontal increment in the pixel value on the top line |
| v_pix_inc | the vertical increment in pixel value of the left edge |

The pseudocode that may implement the Gouraud shading may be:

```
for all lines {
    starting at left_adx and left_pix
    horizontally interpolate width pixels by h_pix_inc
        then interpolate left_adx, left_pix and width, by
        left_adx_inc, v_pix_inc and width_inc
    end}
```

The microcode used to implement the Gouraud shading may look like:
gshade_triangle:

```
vloop:
        st_s    #0, rx              ; clear offset of current pix
        st_s    width, rc0          ; setup width counter
        st_s    left_adx, xybase    ; setup start address of
                                      pixels
        mv_v    left_pix, cur_pix   ; scratch value for current
                                      pix
hloop:
        st_p    cur_pix, (xy)       ; write left hand pixel
        add_p   h_pix_inc, cur_pix  ; calc next pixel
        addr    #1,rx               ; point to next pixel to right
        dec     rc0                 ; decrement pixel counter
        bra     c0ne, hloop, nop    ; loop until span done
endspan:
        add     left_adx_inc,       ; next line left edge
                left_adx
        add     width_inc, width    ; next line width
        addp    v_pix_inc, left_pix ; left pix start value
        dec     rc1                 ; decrement vertical counter
        bra     c1ne, vloop, nop
end:
```

Now, the same microcode is shown. Curly brackets { } are placed around parts of the microcode, rearranged if necessary, that may be executed in a single clock cycle by the parallel architecture 100 of the MPEs described above.
gshade_triangle:
vloop:

```
vloop:
        st_s    #0, rx              ; clear offset of current pix
        st_s    width, rc0          ; setup width counter
        st_s    left_adx, xybase    ; setup start address of
                                      pixels
        mv_v    left_pix, cur_pix   ; scratch value for current
                                      pix
hloop:
{       st_p    cur_pix, (xy)       ; write left hand pixel
        add_p   h_pix_inc, cur_pix  ; calc next pixel
        addr    #1,rx               ; point to next pixel to right
        dec     rc0                 ; decrement pixel counter
        bra     c0ne, hloop, nop    ; loop until span done
endspan:
}
{       add     left_adx_inc,       ; next line left edge
                left_adx
        add     width_inc, width    ; next line width
        dec     rc1                 ; decrement vertical counter
}
{       addp    v_pix_inc, left_pix ; left pix start value
        bra     c1ne, vloop, nop
}
end:
```

As shown, all of the instructions within the "hloop" may be executed in a single clock cycle, thus reducing the time required to perform Gouraud shading on an image composed of triangles.

Figure 5:
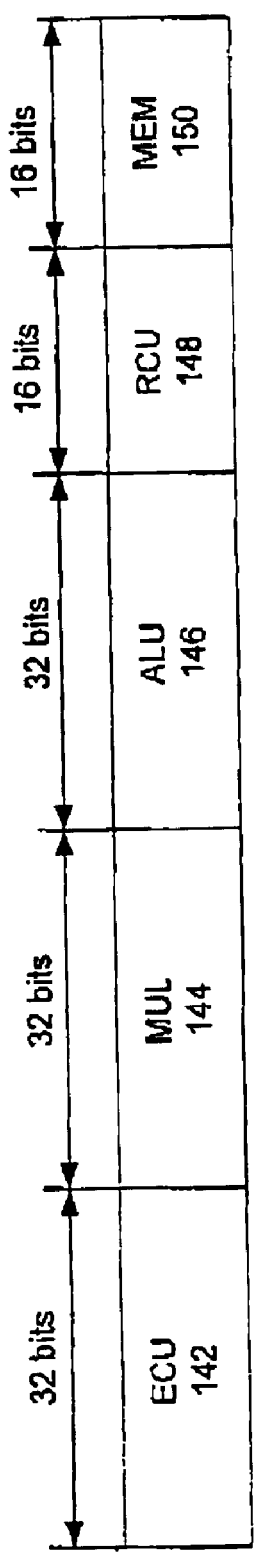
FIG. 5 is a diagram of a very long instruction word that may control various processing units that are part of a processing element.

FIG. 5 is a diagram of an example very long instruction word (VLIW) 140, in accordance with the present invention.

The VLIW instructions may be of variable length and may contain an instruction word for any or all of the processing units, so that for every clock cycle, each processing unit may execute a separate instruction. For example, VLIW 140 may contain an ECU_CTRL instruction word 142 for controlling ECU unit 106, a MUL_CTRL instruction word 144 for controlling MUL unit 114, an ALU_CTRL instruction word 146 for controlling ALU unit 112, an RCU_CTRL instruction word 148 for controlling RCU unit 110, and a MEM_CTRL instruction word 150 for controlling MEM unit 108. The ECU_CTRL MUL_CTRL, and the ALU_CTRL instructions may be of variable length, and are shown here for purpose of example as each being 32 bits long. The RCU_CTRL and MELM_CTRL instructions also may be of variable length, and are shown here for purpose of example as each being 16 bits long. The length of each of these instructions typically varies depending on the processing unit. In this example, the length of the complete VLIW 140 is 128 bits. The length of any VLIW depends on the number of processing units being used, and whether or not the VLIW has been compressed in any manner.

Figure 6:
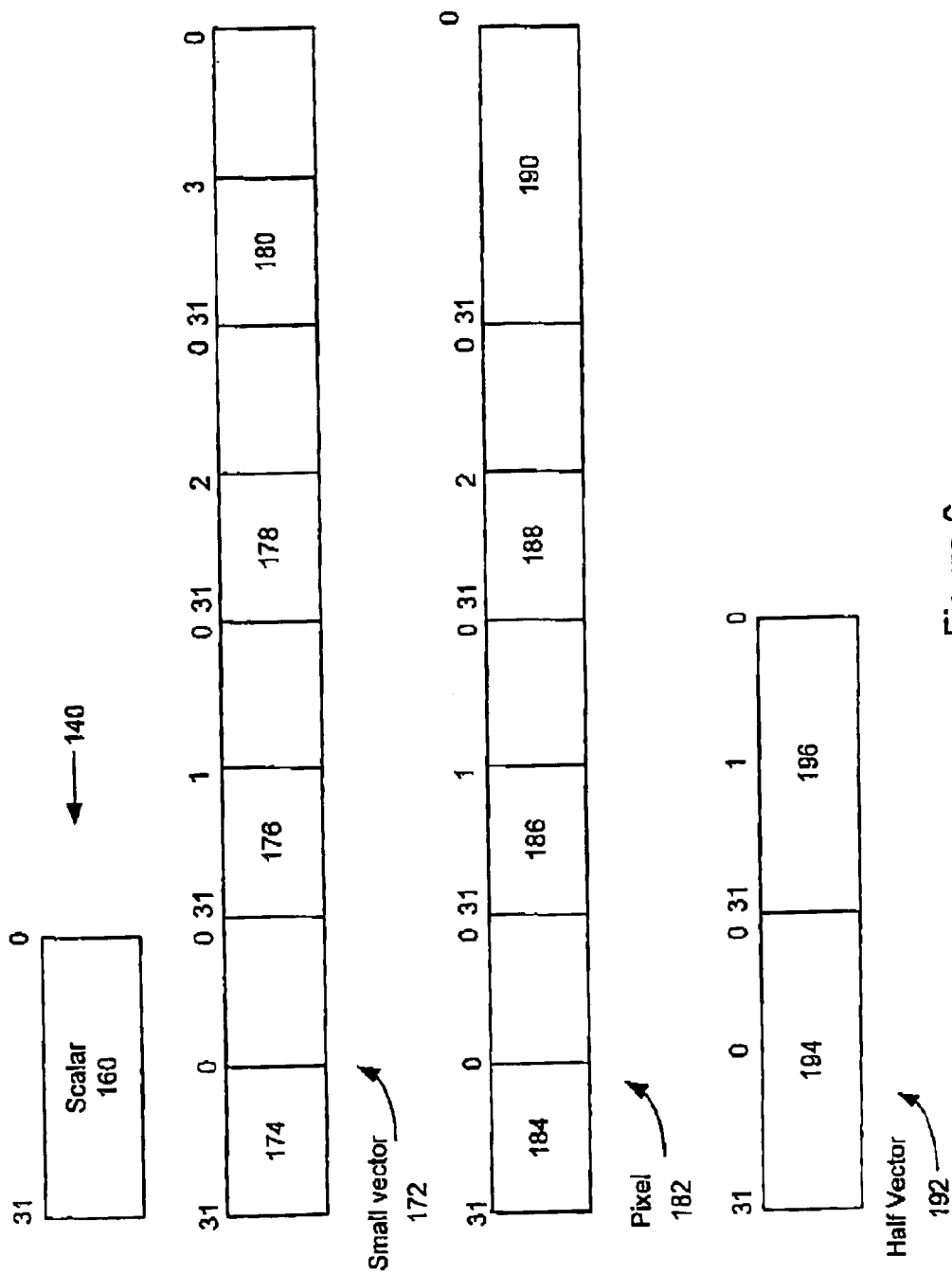
FIG. 6 is a diagram of the different data types that may be used by a media processor in accordance with the invention.

Referring now to FIG. 6, a diagram illustrating the various data types that are supported by media processor 32 and by each MPE 66–72 is shown. The simplest data type is a scalar type 160 that preferably is a 32-bit scalar value. Scalar type 160 may form the basic data type on which all of the other data types are based. For example, a vector data type 162 may comprise four 32-bit scalar data types 164, 166, 168, and 170, so that the total length of the vector is 128 bits. Similarly, a small vector 172 also may be defined for certain types of instructions and is similar to a vector in that it comprises four 32-bit scalar data types 174, 176, 178 and 180. However, the data portion of a small vector is only 64 bits, so the lower half of each scalar register 174–180, as shown by the shaded areas, is set to zero. Similarly, a pixel data type 182 also may comprise four scalar registers 184, 186, 188 and 190. Since a pixel typically is defined as a 16-bit value for each primary color (e.g., red, green and blue), three 16-bit quantities are used for a total of 48 bits. For a pixel, the lower halves of scalar registers 184, 186, 188 are set to zero. In addition, since only three 16-bit values typically are needed, all the bits in the last scalar register 190 are set to zero or used to hold some other value, such as the Z (depth) of the pixel. Use of pixel data type 182 preferably increases the processing speed of processor 32, and in particular the MPEs, for graphical applications, because the an entire pixel can be stored in a single data type, and manipulated or processed in a single clock cycle. The last data type is a half vector 192, which preferably comprises two 32-bit scalar data types 194 and 196, giving it a total length of 64 bits.

All the data types 160, 162, 172, and 182 may be stored in register file 116, as a single register or as a combination of a group registers. The different uses of registers in register file 116 are set forth below in Table 1.

TABLE 1

MAJOR REGISTERS IN THE MEDIA PROCESSOR

| Register Name | Use & Structure | Comments |
|---|---|---|
| R0-R31 | 32 bit General Purpose Registers | Physical 32 bit Scalar Registers. Form the building block for all other registers. |
| V0-V7 | Eight 128 bit, Four element Vector Registers | Assembler alias for four Scalar Registers logically combined to form a vector register (e.g., R0-R3 for V0, R4 - R7 for V1, etc. . . .) |
| RX | 16.16 bit address | Used for bilinear address generation with RY |
| RY | 16.16 bit address | Used for bilinear address generation with RX |
| RU | 16.16 bit address | Used for bilinear address generation with RV |
| RV | 16.16 bit address | Used for bilinear address generation with RU |
| RC0 | 16 bit counter | General purpose down counter |
| RC1 | 16 bit counter | General purpose down counter |
| SP | Stack Pointer | |
| RZ | Program address holder | Used for call and return type operations |
| PC | Program Counter | |
| CC | n bits of Condition Codes | |

As shown in Table 1, each media processing element (MPE) 66–72 (FIG. 3) preferably includes a register file 116 comprising thirty-two (32) 32-bit physical registers that preferably store scalar data types. To store any of the other data types described above, the 32-bit long registers are logically combined together. Thus, there are only 32 physical registers, however, these 32 physical registers are used to represent a plurality of data types. For example, R0–R3 may be combined to store a first pixel, R4–R7 may store a second pixel, R8 may store a scalar, and R12–R15 may store a vector for a particular clock cycle. Then, the next clock cycle, these assignments may be changed. This aliasing or logical combining of the physical registers reduces the overall size of the register file, yet retains the ability to support different data types. For example, to store a vector value that requires 128 bits, four of the 32-bit physical registers are logically combined together. Thus, the first defined logical vector register, V0, may be stored in physical registers R0–R3. Since each vector data type requires 4 physical registers, there are a total of eight (8) vector registers available at any one time. Similarly, the small vector and pixel data types also are stored in four physical registers, as described above.

In addition to the data registers that temporarily store data for processing by the processing units in the MPEs, there are also a number of address and system registers. For example, the RX, RY, RU, and RV registers preferably are utilized for bilinear addressing as described in more detail below. Registers RC0 and RC1 are general purpose down counters that may be used by any of processing units 106–114 (FIG. 4) within media processor 32. The SP register is a stack pointer and may be used for pointing to the top of the system program stack in memory. The RZ register may be used for storing an address during program execution after a call subroutine instruction, so that control in the program can be returned to the address saved in register RZ after the subroutine returns control. The PC register is a program counter that may be used to control and trace program execution. There also may be a CC register that is used for storing a plurality of condition codes, as is well known in the art.

A bilinear addressing scheme may be used, for example, for loading and storing pixels, in order to increase the speed of pixel manipulation instructions. For example, a load pixel instruction may have the following bilinear addressing form:

ld_p (xy), P$_i$. This particular instruction uses the RX and RY registers together, but the RU and RV registers, referred to as (uv) in an instruction, also may be used. Each pair of registers, RX, RY and RU, RV, may have an associated set of input/output registers that define the data structure being referenced by the registers. For example, a pixel map data type, as described below, with a width of 64 pixels may be defined by the input/output registers so that any pixel in the 64 pixel map may be loaded or stored using a single bilinear addressed instruction. Thus, the speed of storing and loading pixels may be reduced since a single instruction may load any pixel.

To further increase the flexibility and speed of pixel data type transfers from each media processing element (MPE) to the main DRAM, there are a number of different pixel data types. Some of the pixel data types that are internal to each MPE are generated by converting data types stored in DRAM of media processing system 30. These conversions are carried out because the MPEs are able to process pixel data more quickly in the internal format, as described below. Some of the external DRAM pixel data formats are industry standard formats, such as the MPEG format, and it is difficult for the MPEs to manipulate these formats. The conversion of external DRAM pixel data types to internal MPE pixel data types, and vice versa may be conducted by the DMA system, for example, units 82, 84 or 86 in FIG. 3.

To help understand the conversions, and the internal normal and pixel data types, the pixel data types are shown in Table 2.

TABLE 2

DATA TYPES IN A MEDIA PROCESSING SYSTEM

| Data Type # | Type Name | Store Data Size To Memory | Store Form | Load Form | Load Data Size Into Register File |
|---|---|---|---|---|---|
| 0 | pixel | MPEG 16 bits | NA | ld_p | ¾ vector |
|   |       |              | NA | ld_pz | vector |
| 1 | pixel | 4 bits | NA | ld_p | ¾ vector |
|   |       |        | NA | ld_pz | vector |
| 2 | pixel | 16 bits | NA | ld_p | ¾ vector |
|   |       |         | NA | ld_pz | vector |
| 3 | pixel | 8 bits | NA | ld_p | ¾ vector |
|   |       |        | NA | ld_pz | vector |
| 4 | pixel | 24 + 8 bits | st_p | ld_p | ¾ vector |
|   |       |             | st_pz | ld_pz | vector |
| 5 | pixel | 16 + 16 bits | st_p | ld_p | ¾ vector |
|   |       |              | st_pz | ld_pz | vector |
| 6 | pixel | 24 + 8 + 32 bits | st_p | ld_p | ¾ vector |
|   |       |                  | st_pz | ld_pz | vector |
| 7 | reserved | | | | |
| 8 | byte | 8 bits | NA | ld_b | scalar (msb aligned) (byte,24'b0) |
| 9 | word | 16 bits | NA | ld_w | scalar (msb aligned) (word,16'b0) |
| A | scalar | 32 bits | st_s | ld_s | scalar |
| B | reserved | | | | |
| C | small-vector | 64 bits | st_sv | ld_sv | sm-vector (msb aligned) (word,16'b0, word,16'0, word, 16'b0,word,16'b0) |
| D | vector | 128 bits | st_v | ld_v | vector |
| E | reserved | | | | |
| F | reserved | | | | |

As shown, pixel map type 0 has sixteen (16) bits per pixel. MPEG pixels have the chroma sampled at half the linear resolution of luma, so the MPE memory representation of this type stores eight 8-bit luma (Y) values and four 8-bit chroma (CR,CB) pairs (i.e., 8 pixels) in 128 bits of memory.

As shown, pixel map type 1 has four (4) bits per pixel. The value of the 4 bits represents an index into an arbitrary color look-up table (CLUT), so that the value has no physical relationship with the physical appearance of the pixel. These 4 bit pixel maps may be loaded into a vector register, as described above, after indexing through a color look-up table.

Pixel map type 2 has 16 bits per pixel, wherein the value of the bits represent a color of the pixel as a first chrominance element, $C_b$, a second chrominance element, $C_r$, both of which are 5 bits, and a luminance element, Y, that is 6 bits. As shown, the type 2 pixel maps are 16 bits, and may be stored in DRAM, displayed on a screen and/or loaded into MPE registers, but may not be stored from a register into memory by the MPEs in that format. The DMA system may convert from pixel map type 4 to pixel map type 2 when loading it from memory. Similarly, the DMA system may convert a pixel map type 2 into a pixel map type 4 before storing it back into memory.

As shown, pixel map type 3 has eight (8) bits per pixel. The value of the 8 bits represents an index into an arbitrary color look-up table (CLUT), so that the value has no physical relationship with the physical appearance of the pixel. These 8 bit pixel maps may be loaded into a vector register, as described above, after indexing through a color look-up table.

Pixel map type 4 has 32 bits per pixel. 24 bits of this pixel map represent an actual color of the pixel. As shown, these types of pixel maps may be used for loading pixels from DRAM, for storing the pixels in DRAM or in an MPE memory. This type of pixel map may be stored in a vector register. A type 4 pixel map may have 32 bits per pixel that also represent a color. These 32 bits are divided between a first chrominance element, $C_b$, a second chrominance element, $C_r$, both of which are 8 bits, and a luminance element, Y, that also may be 8 bits. The last 8 bits are spare bits, which may be used for other pixel attributes.

A type 5 pixel map may have 16 bits per pixel and a 16 bit control value. The 16 bit control value may be used for a Z-buffer depth. The 16 bits per pixel are allocated between $C_b$, $C_r$ and Y, in the same manner as for pixel map type 4.

A type 6 pixel map may have 32 bits per pixel with an associated 32 bit control word. The control word may be used for Z-buffering depth. The 16 bits per pixel are arranged in the same manner as the type 4 pixel map.

Now, the detailed architecture of the processing units 106–114 within each MPE 66–72 will be described in more detail.

Figure 7:
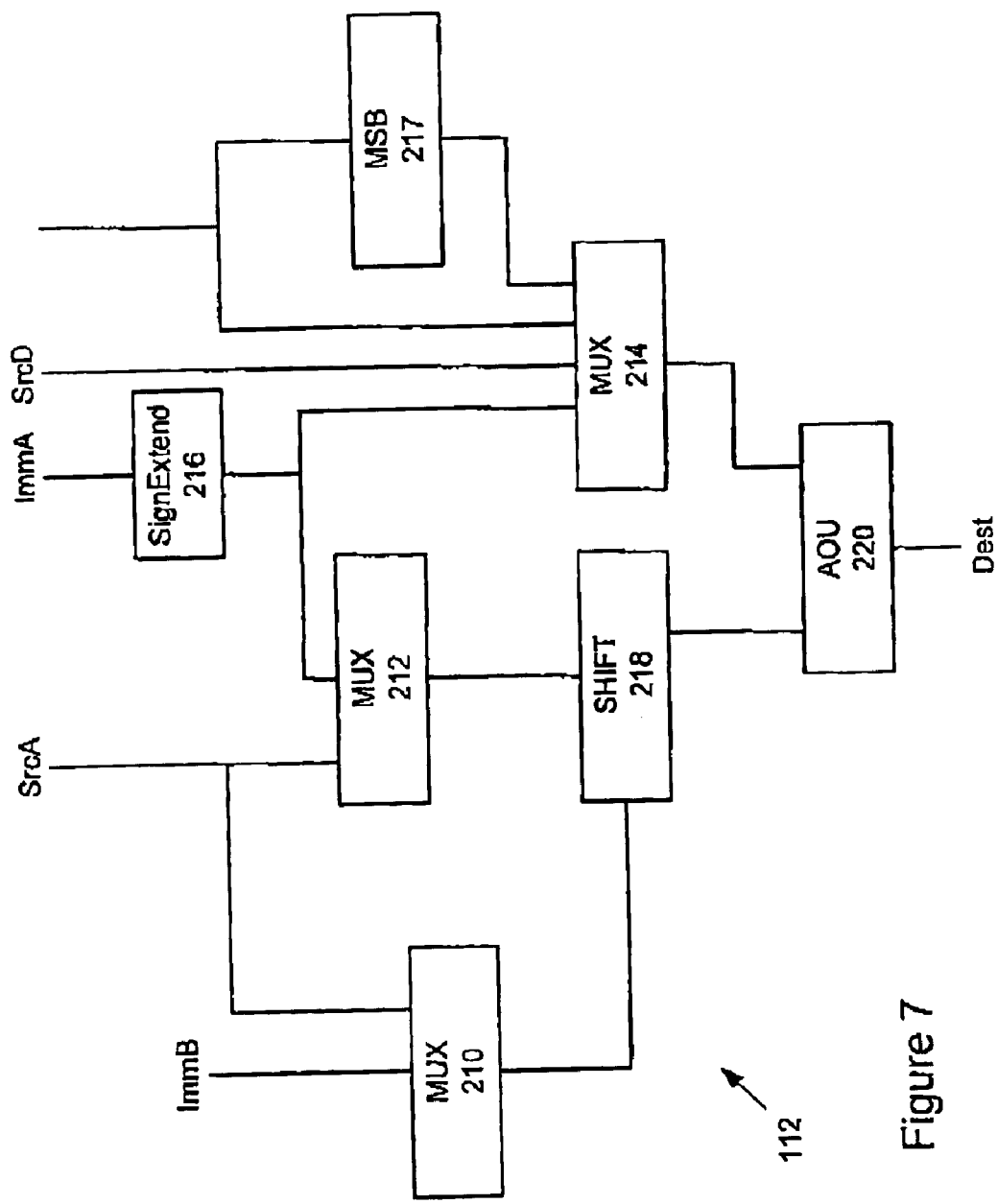
FIG. 7 is a more detailed block diagram of an arithmetic logic unit (ALU) in accordance with the invention.

FIG. 7 is a more detailed diagram of one embodiment of an arithmetic logic unit (ALU) 112 in accordance with the present invention and preferably is optimized for pixel data. As shown, ALU 112 is flexible because the inputs and outputs of ALU 112 may be directed to and from a variety of different sources, as described below. In addition, ALU 112 may include an additional adder/subtractor, as described below with reference to FIG. 8, so that ALU 112 may perform arithmetic and logical operations on an entire pixel in a single clock cycle.

ALU 112 includes a plurality of switches 210, 212, and 214, such as multiplexers or the like, which are configured to select data from one of a number of source inputs of ALU 112. For example, switch 210 may select data from a Src A, which in accordance with the present invention is a 32-bit data type stored in any one of the registers, or from immediate data (ImmB) stored in the ALU instructions. Similarly, second switch 212 may select data from Src A, or from an immediate value (ImmA) stored in the ALU instruction. The ImmA immediate data also may be sign extended by a sign extender 216 prior to entering the switch. The ImmA data, Src B data, Src D data, or the most significant bits of Src B data may be selected by third switch 214. The most significant bits of Src B data may be determined by a most significant bit (MSB) unit 217.

The outputs of first switch 210 and second switch 212 may be shifted or rotated in either direction by a shifter 218. The output of the shifter then may be fed into an arithmetic operation unit (AOU) 220. The other input of AOU 220 is the output of third switch 214. Thus, data entering AOU 220 may be selected from a plurality of different sources, and a number of different operations may be carried out on the data prior to entering the AOU. This flexibility permits ALU 112 to process a variety of different data types. AOU 220 may perform additions, subtractions, logical ANDs, logical ORs, and logical EXCLUSIVE ORs. The output of AOU 220 is a 32 bit value that may be routed to a plurality of destinations. ALU 112 also may be used for processing a single pixel in a single clock cycle, as will now be described with reference to FIG. 8.

Figure 8:
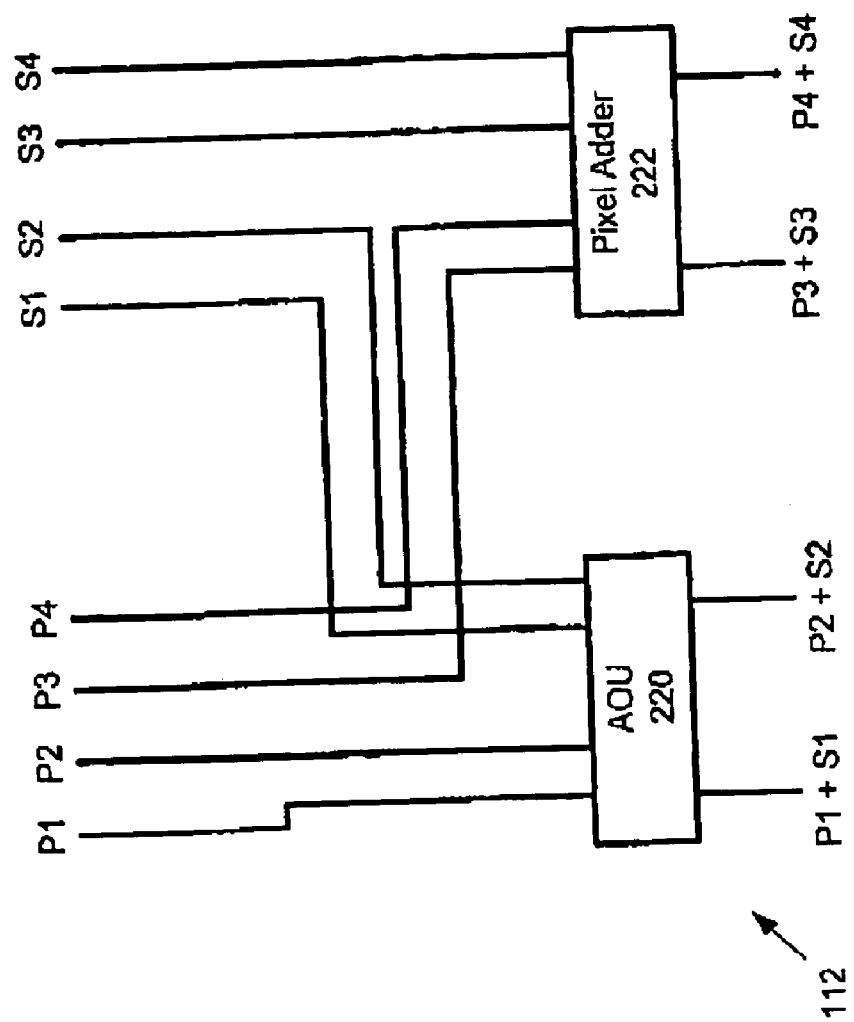
FIG. 8 is a diagram of a first pixel and a second pixel being combined in accordance with the invention.

Referring now to FIG. 8, a diagram of the ALU 112 that has been configured to process a pixel in accordance with the invention is shown. As shown, ALU 112 includes AOU 220, as well as an additional adder/subtractor unit 222. The additional adder/subtractor 222 performs the same operations as AOU 220. In operation, a first pixel with elements $P_1$, $P_2$, $P_3$, and $P_4$ and a second pixel with elements $S_1$, $S_2$, $S_3$, and $S_4$ for example, may be added together. Element $P_1$ preferably is added to element $S_1$ and element $P_2$ preferably is added to element $S_2$ by AOU 220 that adds 32-bit values. To add these 16-bit pixel elements, the carry forward chain in AOU 220 may be broken between bits 15 and 16. The additional elements for each pixel, $P_3$, $P_4$, $S_3$ and $S_3$, may be added together by the additional adder/subtractor 222 at the same time as the other elements are being added together. Thus, ALU 112, in accordance with the present invention, permits a pixel to be arithmetically and logically combined with another pixel in a single clock cycle to increase the speed of pixel intensive applications, such as three-dimensional image processing.

Figure 9:
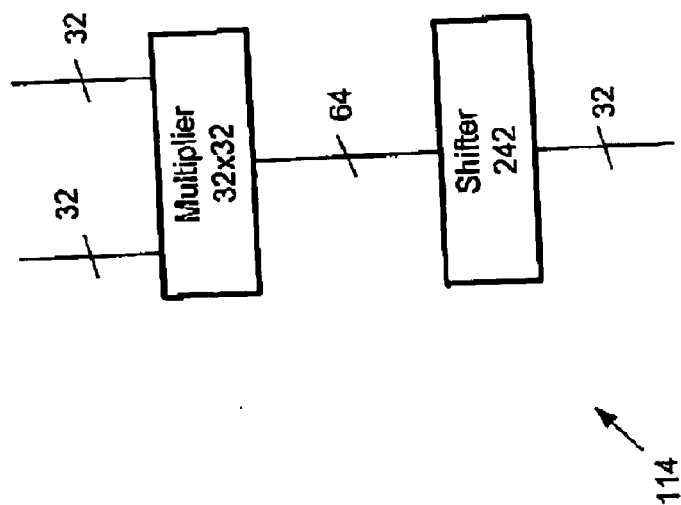
FIG. 9 is a more detailed block diagram of a multiply unit (MUL) in accordance with the invention.

FIG. 9 is a diagram showing an architecture of an MUL unit 114 in accordance with one embodiment of the present invention. MUL unit 114 may be configured to rapidly process pixels every clock cycle, as described below. As shown, MUL 114 unit may comprise a 32-bit×32-bit multiplier 240 that multiplies two 32-bit numbers together to generate a 64-bit result. In addition, MUL unit 114 may further comprise a shifter 242 for selecting any 32-bit part of the product to write back to registers. MUL unit 114, in accordance with the present invention, may quickly and easily calculate higher powers of a variable. For example, to calculate $x^3$, x may be multiplied by x to generate an output equal to $x^2$. The $x^2$ output may then be fed back to the MUL input so that $x^2$ may then be multiplied again by x to generate an output equal to $x^3$. MUL unit 114 also may quickly process pixel data types, as described with reference to FIG. 10.

Figure 10:
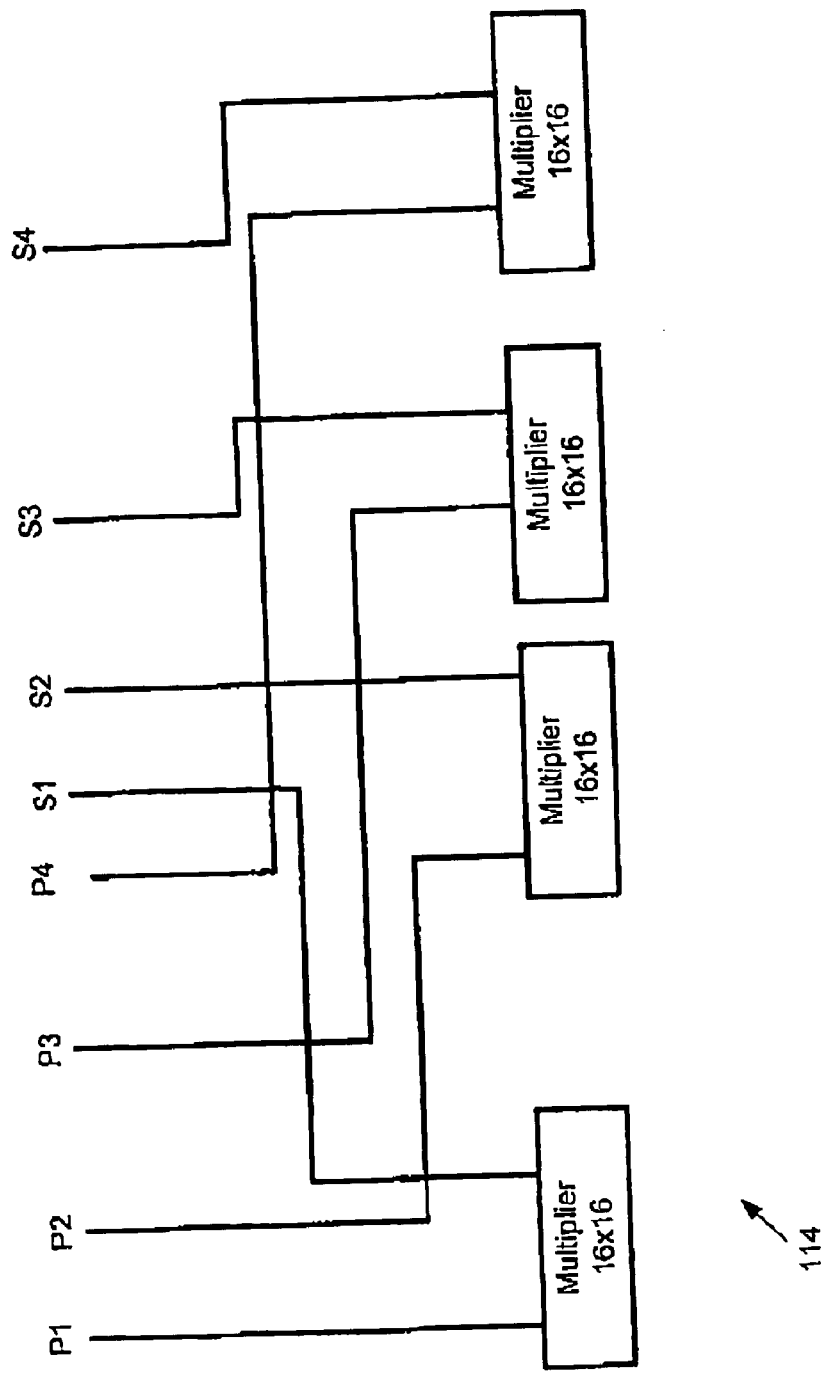
FIG. 10 is a block diagram of two pixels being multiplied together in accordance with the invention.

FIG. 10 is a diagram showing how an MUL unit 214 processes a pixel or small vector data type in accordance with the present invention. The 32-bit by 32-bit MUL 214 may be configured so that MUL unit 114 may be broken down into four 16-bit by 16-bit multipliers 246, 248, 250 and 252. In addition, these four 16-bit by 16-bit multipliers are separately addressable. Therefore, to multiply a first pixel or small vector with elements $P_1$, $P_2$, $P_3$, and $P_4$ together with a second pixel or small vector with elements $S_1$, $S_2$, $S_3$, and $S_4$, elements $P_1$ and $S_1$ preferably are multiplied by first multiplier 246. At the same time, elements $P_2$ and $S_2$ are multiplied by second multiplier 248, elements $P_3$ and $S_3$ are multiplied by third multiplier 250, and elements P4 and S4 are multiplied by fourth multiplier 252. Thus, an entire pixel or small vector may be multiplied by a second entire pixel or small vector in a single clock cycle using MUL unit 114, thus increasing the processing speed of the media processing system for graphics applications that use pixels. In addition, MUL unit 114 may be configured to multiply two 32-bit values as well as configured to multiply two pixels or small vectors together.

In addition, the media processing system also may have some specialized pixel instructions that further increase the speed with which pixels may be processed. For example, there may be a load pixel, store pixel, multiply pixel, and an add pixel instruction that may use the pixel data type. In addition, as described above, the bilinear addressing scheme also may increase the speed with which images, made up of a plurality of pixels, are processed.

In summary, the architecture of the media processing system provides significant enhancement to pixel processing so that pixel based data, such as images, may be rapidly processed. However, since the media processing system and the MPEs are general purpose, the media processing system also may be used for a number of other speed and processing power intensive operations.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A user configurable universal media processing system arranged to receive and process any of a number of type of digital data, comprising:

a memory unit for storing the digital data including video digital data and audio digital data being processed by said media processing system;

a number of distributed configurable media processing elements (MPE) suitably arranged to provide distributed processing of said digital data each being coupled to the memory unit thereby enabling selected portions of the digital data to be shared and processed amongst the media processing elements, wherein at least one of said configurable MPEs is dynamically configured to act, at least in part, as a control processing element suitably arranged to control the distribution of said digital data between some or all of the MPEs, schedule tasks for the MPEs, wherein each of the distributed MPEs process a selected portion of the digital data in concert with the other MPEs thereby increasing the overall speed and efficiency of the media processing system, and provide a control signal to selected ones of the MPEs wherein said control signal causes the selected MPEs to reconfigure in order to process a selected digital data type; and a number of communication busses suitably arranged to interconnect the memory unit, the number of media processing elements and the control processing element, whereby control signals/commands and data are transferred throughout the media processing system on separate ones of the communications busses thereby increasing the overall processing power of the media processing system.

2. A system as recited in claim 1 further comprising:

a data stream parser unit coupled to the memory unit arranged to parse the digital data into a number of sub-data streams each being suitable for processing by selected MPEs.

3. A system as recited in claim 1, wherein each of the MPEs is a signal instruction stream, multiple data stream (SIDM) general purpose very long word (VLIW) RISC processor capable of operating independently of the other MPEs.

4. A system as recited in claim 1 wherein, based upon a signal provided by the processor control element, selected ones of the MPEs cooperatively perform a particular task.

5. A system as recited in claim 4, wherein when the particular task is selected from a group that includes graphics processing, database searching, numerical processing, and video processing.

6. A system as recited in claim 5, wherein the digital data is stored on an external medium in a format consistent with a particular external medium.

7. A system as recited in claim 6, wherein the external medium includes a compact disc (CD), a laser disc (LD), a digital versatile disc (DVD) and wherein the respective formats include a compressed audio format, a first type compressed video and first type compressed audio format, and a second type compressed video format and a second type compressed audio format such that the universal media processor identifies the particular format and reconfigures selected ones of the MPEs accordingly in order to successfully process the corresponding digital data.

8. A system as recited in claim 6 wherein the particular task is processing an MPEG-2 video stream, the process element controller directs selected MPEs to decode the MPEG-2 data, other selected MPEs to generate full motion color based upon the decoded MPEG-2 data, other MPEs to generate audio streaming data.

9. A system as recited in claim 1, wherein the memory device includes a main system memory, and wherein the number of busses includes, a main system bus coupled to the main system memory;

a supplemental bus separate from the main system bus arranged to communicate with the main system memory capable of providing linear data transfers; and a communication bus used to transfer data packets between selected ones of the MPEs and/or provides a link between the MPEs and a selected one of a number of peripheral devices.

10. A method of processing digital data by a media processing system, comprising:

receiving the digital data;

determining a digital data format associated with the received digital data;

configuring selected ones of a number of configurable media processing elements (MPE) in order to process the digital data in to appropriate format;

dynamically configuring at least one of said configurable MPEs to act, at least in part, as a control processing element suitably arranged to control the distribution of said digital data between some or all of the MPEs, schedule tasks for the MPEs, wherein each of the distributed MPEs process a selected portion of the digital data in concert with the other MPEs thereby increasing the overall speed and efficiency of the media processing system; and outputting the processed digital data.

11. A method as recited in claim 10, further comprising:

storing the received digital data in a memory device coupled to each of the MPEs.

12. A method as recited in claim 10, further comprising:

providing a control signal to selected ones of the MPEs wherein said control signal causes the selected MPEs to reconfigure in order to process the digital data in the determined format.

13. A method as recited in claim 12, further comprising:

parsing the digital data; and scheduling tasks for the MPEs based upon processing of the parsed digital data, wherein each of the distributed MPEs process a selected portion of the parsed digital data in concert with the other MPEs thereby increasing the overall speed and efficiency of the media processing system.

14. A method as recited in claim 13, further comprising:

providing a number of communication busses suitably arranged to interconnect the memory unit, the number of media processing elements and a control processing element, whereby control signals/commands and data are transferred throughout the media processing system on separate ones of the communications busses thereby increasing the overall processing power of the media processing system.

15. A method of as recited in claim 10, further comprising:

wherein said digital video data is compressed in a first standardized format, processing said digital data that includes said standardized compressed video data to produce compressed video images and image data;

decoding said first standardized format compressed video images to generate full motion video pixel data by selected ones of the MPEs;

sharing a DRAM between said MPEs; and producing a full motion video signal from said full motion video pixel data, wherein the selected ones of the MPEs used for decoding the first standardized format compressed video images is adapted for reconfiguration to decode digital data including data that is compressed in a second standardized format.

16. Computer program product for processing digital data by a media processing system, comprising:

computer code for receiving the digital data;

computer code for determining a digital data format associated with the received digital data;

computer code for configuring selected ones of a number of media processing elements (MPE) in order to process the digital data in the appropriate format;

computer code for dynamically configuring at least one of said configurable MPEs to act, at least in part, as a control processing element suitably arranged to control the distribution of said digital data between some or all of the MPEs, schedule for tasks for the MPEs, wherein each of the distributed MPEs process a selected portion of the digital data in concert with the other MPEs thereby increasing the overall speed efficiency of the media processing system;

computer code for outputting the processed digital data; and computer readable medium for storing the computer code.

17. Computer program product as recited in claim 16, further comprising:

storing the received digital data in a memory device coupled to each of the MPEs.

18. Computer program product as recited in claim 16, further comprising:

computer code for providing a control signal to selected ones of the MPEs wherein said control signal causes the selected MPEs to reconfigure in order to process the digital data in the determined format.

19. Computer program product as recited in claim 18, further comprising:

computer code for parsing the digital data; and computer code for scheduling tasks for the MPEs based upon processing of the parsed digital data, wherein each of the distributed MPEs process a selected portion of the parsed digital data in concert with the other MPEs thereby increasing the overall speed and efficiency of the media processing system.

20. Computer program product as recited in claim 19, further comprising:

providing a number of communication busses suitably arranged to interconnect the memory unit, the number of media processing elements and a control processing element, whereby control signals/commands and data are transferred throughout the media processing system on separate ones of the communications busses thereby increasing the overall processing power of the media processing system.

21. Computer program product as recited in claim 20, further comprising:

wherein said digital video data is compressed in a first standardized format, computer code for processing said digital data that includes said first standardized format compressed video data to produce compressed video images and image data;

computer code for decoding said first standardized format compressed video images to generate full motion video pixel data by selected ones of the MPEs;

computer code for sharing a DRAM between said MPEs; and computer code for producing a full motion video signal from said full motion video pixel data, wherein the selected ones of the MPEs used for decoding the first standardized format compressed video images is adapted for reconfiguration to decode digital data including data that is compressed in a second standardized format.

\* \* \* \* \*

UNITED STATES PATENT AND TRADEMARK OFFICE
CERTIFICATE OF CORRECTION

PATENT NO. : 6,847,365 B1
DATED : January 25, 2005
INVENTOR(S) : Miller et al.

It is certified that error appears in the above-identified patent and that said Letters Patent is hereby corrected as shown below:

Column 3,
Line 48, change "fall-motion" to -- full-motion --.

Column 13,
Line 14, change "MELM_CTRL" to -- MEM_CTRL --.

Colum 19,
Line 4, change "signal instruction" to -- single instruction --.
Line 5, change "(SIDM)" to -- (SIMD) --.
Line 28, change "wherein the" to -- wherein when the --.
Line 32, change "color based" to -- color images based --.
Line 53, change "data in to" to -- data in the --.

Column 20,
Line 28, change "said standardized" to -- said first standardized --.
Line 29, change "compressed" to -- format compressed --.
Line 55, change "for tasks for" to -- tasks for --
Line 58, change "speed efficiency" to -- speed and efficiency --.

Column 22,
Line 5, change "wherein said" to -- wherein when said --.

Signed and Sealed this

Twenty-fourth Day of May, 2005

JON W. DUDAS
*Director of the United States Patent and Trademark Office*